US011929044B1

(12) United States Patent
Qiu et al.

(10) Patent No.: US 11,929,044 B1
(45) Date of Patent: Mar. 12, 2024

(54) BACKLIGHT MODULE AND DISPLAY APPARATUS

(71) Applicant: HKC CORPORATION LIMITED, Guangdong (CN)

(72) Inventors: Bin Qiu, Guangdong (CN); Rongrong Li, Guangdong (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/343,177

(22) Filed: Jun. 28, 2023

(30) Foreign Application Priority Data

Nov. 30, 2022 (CN) ........................ 202211517709.X

(51) Int. Cl.
*G09G 3/34* (2006.01)

(52) U.S. Cl.
CPC ... *G09G 3/3426* (2013.01); *G09G 2320/0633* (2013.01)

(58) Field of Classification Search
CPC ..................... G09G 3/3426; G09G 2320/0633
See application file for complete search history.

(56) References Cited

U.S. PATENT DOCUMENTS

2011/0063338 A1 3/2011 Sedzin et al.
2014/0055507 A1 2/2014 Sakurai et al.
2017/0150564 A1 5/2017 Jang et al.
2020/0103703 A1* 4/2020 Yoshinaga ........ G02F 1/133603
2020/0301202 A1 9/2020 Cheng
2023/0217563 A1* 7/2023 Hu ......................... H05B 45/40
315/51

FOREIGN PATENT DOCUMENTS

CN 102065610 A 5/2011
CN 102141214 A 8/2011
CN 102434811 A 5/2012
CN 102483196 A 5/2012
CN 102537754 A 7/2012
CN 103369780 A 10/2013
(Continued)

OTHER PUBLICATIONS

The first office action issued in corresponding CN application No. 202211517709.X dated Jan. 11, 2023.
(Continued)

*Primary Examiner* — Towfiq Elahi
(74) *Attorney, Agent, or Firm* — HAUPTMAN HAM, LLP

(57) ABSTRACT

The disclosure provides a backlight module. The backlight module has a first light-emitting region and a second light-emitting region encircling the first light-emitting region. The backlight module further includes at least one first light-emitting module and at least one second light-emitting module, the at least one second light-emitting module is arranged on a peripheral side of the first light-emitting module, the at least one first light-emitting module is located in the first light-emitting region, and the at least one second light-emitting module is located in the second light-emitting region. The first light-emitting module includes multiple first light strings, the second light-emitting module includes multiple second light strings, and the multiple first light strings has a layout density greater than the multiple second light strings.

8 Claims, 5 Drawing Sheets

(56) References Cited

FOREIGN PATENT DOCUMENTS

| | | | |
|---|---|---|---|
| CN | 106402707 | A | 2/2017 |
| CN | 108873469 | A | 11/2018 |
| CN | 109407399 | A | 3/2019 |
| CN | 110824766 | A | 2/2020 |
| CN | 112505966 | A | 3/2021 |
| CN | 113325629 | A | 8/2021 |
| CN | 114913820 | A | 8/2022 |
| JP | 2012133938 | A | 7/2012 |
| KR | 20160000493 | A | 1/2016 |
| TW | 201431429 | A | 8/2014 |
| TW | 201511609 | A | 3/2015 |

OTHER PUBLICATIONS

WIPO, International Search Report and Written Opinion for International Application No. PCT/CN2023/102442, dated Oct. 11, 2023.

* cited by examiner

BACKLIGHT MODULE AND DISPLAY APPARATUS

CROSS-REFERENCE TO RELATED APPLICATION(S)

This application claims priority under 35 U.S.C. § 119(a) to Chinese Patent Application Serial No. 202211517709.X, filed Nov. 30, 2022, the entire disclosure of which is incorporated herein by reference.

TECHNICAL FIELD

The disclosure relates to the field of display technology, and more particularly, to a backlight module and a display apparatus equipped with the backlight module.

BACKGROUND

At present, more and more display apparatuses adopt a Mini Light-Emitting Diode (Mini LED) backlight module as a backlight source. The Mini LED backlight module can be of a direct-lit type and adopt a design of small spacing between Mini LED light beads to achieve small-scale dimming through dense arrangement of a large number of Mini LED light beads. Compared with a traditional backlight source, the Mini LED backlight module has better brightness uniformity and higher color contrast, and can achieve an ultra-thin design of the display apparatus and is more energy-saving and power-saving.

However, since in the Mini LED backlight module, a large number of Mini LED light beads are arranged in a unit area, and the Mini LED light beads are not individually controlled, when adjusting the brightness of the Mini LED backlight module, multiple Mini LED light beads in one region can only be adjusted simultaneously, and fine dimming cannot be achieved. Moreover, if the Mini LED light beads are individually controlled to achieve fine dimming, production process and production cost will be greatly increased.

In view of this, it is an urgent problem for those skilled in the art to solve the problem of how to perform fine dimming on the Mini LED backlight module while avoiding excessive increase in production cost.

SUMMARY

In a first aspect, a backlight module is provided. The backlight module has a first light-emitting region and a second light-emitting region encircling the first light-emitting region. The backlight module includes at least one first light-emitting module and at least one second light-emitting module. The at least one second light-emitting module is arranged on a peripheral side of the first light-emitting module. The at least one first light-emitting module is located in the first light-emitting region. The at least one second light-emitting module is located in the second light-emitting region. The first light-emitting module includes multiple first light strings. The second light-emitting module includes multiple second light strings. The multiple first light strings has a layout density greater than the multiple second light strings. The first light string includes a first light-emitting column, a second light-emitting column, and a first switch unit, the first switch unit is electrically connected to a first terminal of the first light-emitting column, a first terminal of the second light-emitting column, and a second terminal of the second light-emitting column. The first switch unit is configured to selectively connect the first light-emitting column and the second light-emitting column in series, or electrically connect the first terminal of the first light-emitting column to the first terminal of the second light-emitting column.

In a second aspect, a display apparatus is provided. The display apparatus has a first display region and a second display region encircling the first display region, where the display apparatus includes a backlight module having a first light-emitting region and a second light-emitting region encircling the first light-emitting region, where the backlight module includes at least one first light-emitting module and at least one second light-emitting module, the at least one second light-emitting module is arranged on a peripheral side of the first light-emitting module, the at least one first light-emitting module is located in the first light-emitting region, and the at least one second light-emitting module is located in the second light-emitting region. The first light-emitting module includes multiple first light strings, the second light-emitting module includes multiple second light strings, and the multiple first light strings has a layout density greater than the plurality of second light strings. The first light string includes a first light-emitting column, a second light-emitting column, and a first switch unit, the first switch unit is electrically connected to a first terminal of the first light-emitting column, a first terminal of the second light-emitting column, and a second terminal of the second light-emitting column, and the first switch unit is configured to selectively connect the first light-emitting column and the second light-emitting column in series, or electrically connect the first terminal of the first light-emitting column to the first terminal of the second light-emitting column. The first light-emitting module of the backlight module is located in the first display region, and the second light-emitting module of the backlight module is located in the second display region.

BRIEF DESCRIPTION OF THE DRAWINGS

In order to more clearly illustrate technical solutions of implementations of the disclosure, the following will briefly introduce drawings required in implementations. Obviously, the drawings in the following description are some implementations of the disclosure. For those of ordinary skill in the art, other drawings can also be obtained from these drawings without creative effort.

DESCRIPTION OF REFERENCE NUMBERS

Figure 1:
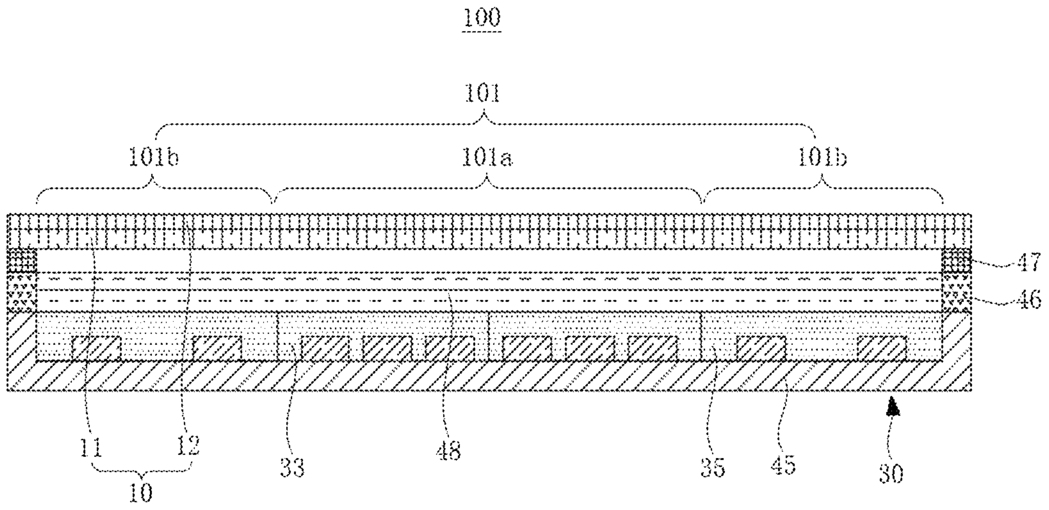
FIG. 1 is a schematic diagram of a layered structure of a display apparatus disclosed in a first implementation of the disclosure.

10—display panel; 11—array substrate; 12—color substrate; 30—backlight module; 31—light-emitting region; 31*a*—first light-emitting region; 31*b*—second light-emitting region; 33—first light-emitting module; 35—second light-emitting module; 36—control module; 37—first drive module; 38—second drive module; 39—logic module; 41—switch module; 42—power supply module; 45—backplane; 46—plastic frame; 47—buffer pad; 48—optical film assembly; 100—display apparatus; 101—display region; 101*a*—first display region; 101*b*—second display region; 330—first light string; 330*a*—first light string; 331—first light-emitting column; 333—second light-emitting column; 335—first switch unit; 335*a*—first drive transistor; 335*b*—second drive transistor; 335*c*—third drive transistor; 337—second switch unit; 337*a*—fourth drive transistor; 337*b*—fifth drive transistor; 337*c*—sixth drive transistor; 350—second light string; 351—third light-emitting column; 371—first drive unit; 372—first connection terminal; 373—second connection terminal; 381—second drive unit; 382—third connection terminal; 383—fourth connection terminal.

DETAILED DESCRIPTION

To facilitate understanding of the disclosure, the disclosure will be described in details below with reference to the related drawings. The preferred implementations of the disclosure are shown in the drawings. However, the disclosure may be implemented in many different forms and is not limited to the implementations described herein. Rather, these implementations are provided for a thorough and complete understanding of the disclosure.

The following descriptions of various implementations are with reference to the accompanying figures to illustrate the specific implementations that can be implemented by the disclosure. The serial numbers themselves, such as "first", "second", etc., for the components herein are only used to distinguish the described objects, and do not have any order or technical meaning. Furthermore, the "connection" and "coupling" mentioned in the disclosure, unless otherwise specified, include both direct and indirect connection (coupling). Directional terms mentioned in the disclosure, such as "upper", "lower", "front", "rear", "left", "right", "inner", "outer", "side", etc., are merely references of directions of the accompanying drawings. Accordingly, the directional terms are used for better and clearer description and understanding of the disclosure, rather than indicating or implying that the referred device or element must have a particular orientation, be constructed and operate in a particular orientation. Therefore, it should not be construed as a limitation on the disclosure.

In the description of the disclosure, it should be noted that, unless otherwise expressly specified and limited, the terms "installed", "connected", and "coupled" should be understood in a broad sense. For example, it may be a fixed connection, a detachable connection, or an integral connection; a mechanical connection; a direct connection, an indirect connection through an intermediate medium, or an internal communication between two components. For those of ordinary skill in the art, the specific meanings of the above terms in the disclosure can be understood in specific situations. It should be noted that the terms "first", "second" and the like in the description, claims, and drawings of the disclosure are used to distinguish different objects, rather than to describe a specific order. In addition, the terms "include", "can include", "contain", or "can contain" used in the disclosure indicate the existence of the disclosed corresponding functions, operations, elements, etc., and do not limit other one or more functions, operations, components, etc. Furthermore, the terms "include" or "contain" mean corresponding features, numbers, steps, operations, elements, components, or combinations thereof disclosed in the specification, without excluding the presence or addition of one or more other features, numbers, steps, operations, elements, components, or combinations thereof, and are intended to cover the non-exclusive inclusion. In addition, when describing implementations of the disclosure, the use of "may" means "in one or more implementations of the disclosure". Also, the word "exemplary" is intended to mean an example or an illustration.

Unless otherwise defined, all technical and scientific terms used herein have the same meaning as commonly understood by one of ordinary skill in the technical field to which the disclosure belongs. The terms used herein in the specification of the disclosure are merely for describing the implementations but are not intended to limit the disclosure.

In view of above deficiencies in the related art, the disclosure aims to provide a backlight module and a display apparatus equipped with the backlight module to achieve fine dimming on the Mini LED backlight module while avoiding excessive increase in production cost.

To solve the above technical problem, the disclosure provides a backlight module. The backlight module has a first light-emitting region and a second light-emitting region encircling the first light-emitting region. The backlight module includes at least one first light-emitting module and at least one second light-emitting module. The at least one second light-emitting module is arranged on a peripheral side of the first light-emitting module. The at least one first light-emitting module is located in the first light-emitting region. The at least one second light-emitting module is located in the second light-emitting region. The first light-emitting module includes multiple first light strings. The second light-emitting module includes multiple second light strings. The multiple first light strings has a layout density greater than the multiple second light strings.

In conclusion, the backlight module disclosed in implementations of the disclosure includes at least one first light-emitting module and at least one second light-emitting module. The at least one second light-emitting module is arranged on a peripheral side of the first light-emitting module. The at least one first light-emitting module is located in the first light-emitting region. The at least one second light-emitting module is located in the second light-emitting region. The first light-emitting module includes multiple first light strings. The second light-emitting module includes multiple second light strings. The multiple first light strings has a layout density greater than the multiple second light strings. Therefore, since the multiple first light strings in the first light-emitting region has a layout density greater than the multiple second light strings in the second light-emitting region, fine dimming can be achieved in the first light-emitting region, thereby improving the visual experience of the user. Moreover, since the first light-emitting region is in a middle region of the backlight module, only the first light-emitting module has the increase in production process and production cost, which avoids excessive increase in production process and production cost.

In exemplary implementations, the first light string includes a first light-emitting column, a second light-emitting column, and a first switch unit, the first switch unit is electrically connected to a first terminal of the first light-emitting column, a first terminal of the second light-emitting column, and a second terminal of the second light-emitting column. The first switch unit is configured to selectively connect the first light-emitting column and the second light-emitting column in series, or electrically connect the first terminal of the first light-emitting column to the first terminal of the second light-emitting column.

In exemplary implementations, the first switch unit includes a first drive transistor, a second drive transistor, and a third drive transistor, a first terminal of the first drive transistor and a first terminal of the second drive transistor are electrically connected to the first terminal of the first light-emitting column, a second terminal of the first drive transistor is electrically connected to the first terminal of the second light-emitting column, a second terminal of the second drive transistor and a second terminal of the third drive transistor are electrically connected to the second terminal of the second light-emitting column, a control terminal of the first drive transistor, a control terminal of the second drive transistor, and a control terminal of the third drive transistor are each configured to receive a control signal. The first light-emitting column and the second light-emitting column are connected in series, when the first drive transistor is turned off, the second drive transistor is turned on, and the third drive transistor is turned off. The first terminal of the first light-emitting column is electrically connected to the first terminal of the second light-emitting column, when the first drive transistor is turned on, the second drive transistor is turned off, and the third drive transistor is turned on.

In exemplary implementations, the backlight module further includes a control module, and the control module is electrically connected to the control terminal of the first drive transistor, the control terminal of the second drive transistor, and the control terminal of the third drive transistor. The control module is configured to generate a first control signal for controlling the first drive transistor to be turned off and the third drive transistor to be turned off and a second control signal for controlling the second drive transistor to be turned on; or the control module is configured to generate a third control signal for controlling the first drive transistor to be turned on and the third drive transistor to be turned on and a fourth control signal for controlling the second drive transistor to be turned off.

In exemplary implementations, the backlight module further includes multiple first drive modules, each of the first drive modules includes a first drive unit, multiple first connection terminals, and multiple second connection terminals, the multiple first connection terminals are electrically connected to the first terminal of the second light-emitting column, the multiple second connection terminals are electrically connected to a first terminal of the third drive transistor and a second terminal of the first light-emitting column. The first drive unit is configured to control a potential of the second connection terminal to adjust a light-emitting brightness of the first light-emitting column and a light-emitting brightness of the second light-emitting column.

In exemplary implementations, the first light string includes a first light-emitting column, multiple second light-emitting columns, a first switch unit, and at least one second switch unit, the first switch unit is electrically connected to a first terminal of the first light-emitting column, a first terminal of the second light-emitting column, and a second terminal of the second light-emitting column, the second switch unit is electrically connected to a first terminal of one second light-emitting column and a first terminal and a second terminal of another second light-emitting column, and a second terminal of one second light-emitting column is electrically connected to one first switch unit or one second switch unit. The first switch unit and the second switch unit are configured to selectively connect the first light-emitting column and the multiple second light-emitting columns in series, or electrically connect the first terminal of the first light-emitting column to first terminals of the multiple second light-emitting columns.

In exemplary implementations, the first switch unit includes a first drive transistor, a second drive transistor, and a third drive transistor, a first terminal of the first drive transistor and a first terminal of the second drive transistor are electrically connected to the first terminal of the first light-emitting column, a second terminal of the first drive transistor is electrically connected to the first terminal of the second light-emitting column, a second terminal of the second drive transistor and a second terminal of the third drive transistor are electrically connected to the second terminal of the second light-emitting column, a control terminal of the first drive transistor, a control terminal of the second drive transistor, and a control terminal of the third drive transistor are each configured to receive a control signal. The second switch unit includes a fourth drive transistor, a fifth drive transistor, and a sixth drive transistor, a first terminal of the fourth drive transistor and a first terminal of the fifth drive transistor are electrically connected to a first terminal of one second light-emitting column, a second terminal of the fourth drive transistor is electrically connected to a first terminal of another second light-emitting column, a second terminal of the fifth drive transistor and a second terminal of the sixth drive transistor are electrically connected to a second terminal of the another second light-emitting column, a control terminal of the fourth drive transistor, a control terminal of the fifth drive transistor, and a control terminal of the sixth drive transistor are each configured to receive the control signal. The first light-emitting column and the multiple second light-emitting columns are connected in series, when the first drive transistor is turned off, the second drive transistor is turned on, the third drive transistor is turned off, the fourth drive transistor is turned off, the fifth drive transistor is turned on, and the sixth drive transistor is turned off. The first terminal of the first light-emitting column is electrically connected to first terminals of the multiple second light-emitting columns, when the first drive transistor is turned on, the second drive transistor is turned off, the third drive transistor is turned on, the fourth drive transistor is turned on, the fifth drive transistor is turned off, and the sixth drive transistor is turned on.

In exemplary implementations, the backlight module further includes a control module, and the control module is electrically connected to the control terminal of the first drive transistor, the control terminal of the second drive transistor, the control terminal of the third drive transistor, the control terminal of the fourth drive transistor, the control terminal of the fifth drive transistor, and the control terminal of the sixth drive transistor. The control module is configured to generate a first control signal for controlling the first drive transistor to be turned off, the third drive transistor to be turned off, the fourth drive transistor to be turned off, and the sixth drive transistor to be turned off, and a second control signal for controlling the second drive transistor to be turned on and the fifth drive transistor to be turned on; or the control module is configured to generate a third control signal for controlling the first drive transistor to be turned on, the third drive transistor to be turned on, the fourth drive transistor to be turned on, and the sixth drive transistor to be turned on, and a fourth control signal for controlling the second drive transistor to be turned off and the fifth drive transistor to be turned off.

In exemplary implementations, the backlight module includes multiple first drive modules, each of the first drive modules includes a first drive unit, multiple first connection terminals, and multiple second connection terminals, the first connection terminal is electrically connected to a first terminal of one of the multiple second light-emitting columns, the multiple second connection terminals are electrically connected to a first terminal of the third drive transistor, a first terminal of the sixth drive transistor, and a second terminal of the first light-emitting column. The first drive unit is configured to control a potential of the second connection terminal to adjust a light-emitting brightness of the first light-emitting column and a light-emitting brightness of the second light-emitting column.

Based on the same inventive concept, implementations of the disclosure further provide a display apparatus. The display apparatus has a first display region and a second display region encircling the first display region. The display apparatus further includes the above-mentioned backlight module, where the first light-emitting module of the backlight module is located in the first display region, and the second light-emitting module of the backlight module is located in the second display region.

In conclusion, the display apparatus disclosed in implementations of the disclosure includes a backlight module. The backlight module includes at least one first light-emitting module and at least one second light-emitting module. The at least one second light-emitting module is arranged on a peripheral side of the first light-emitting module. The at least one first light-emitting module is located in the first display region. The at least one second light-emitting module is located in the second display region. The first light-emitting module includes multiple first light strings. The second light-emitting module includes multiple second light strings. The multiple first light strings has a layout density greater than the multiple second light strings. Therefore, since the multiple first light strings in the first display region has a layout density greater than the multiple second light strings in the second display region, fine dimming can be achieved in the first display region, thereby improving the visual experience of the user. Moreover, since the first display region is in a middle region of the display apparatus, only the first light-emitting module has the increase in production process and production cost, which avoids excessive increase in production process and production cost.

Referring to FIG. 1, FIG. 1 is a schematic diagram of a layered structure of a display apparatus disclosed in a first implementation of the disclosure. In implementations of the disclosure, the display apparatus 100 may at least include a display panel 10 and a backlight module 30. The display panel 10 is arranged on a light-emitting side of the backlight module 30. The display panel 10 is configured to display images under a backlight provided by the backlight module 30.

In implementations of the disclosure, the display panel 10 may at least include an array substrate 11 and a color substrate 12 stacked on the array substrate 11. The array substrate 11 is arranged on the backlight module 30, and the color substrate 12 is arranged on one side of the array substrate 11 facing away from the backlight module 30. The array substrate 11 is configured to control an electrical signal. The color substrate 12 is configured to display colors.

It can be understood that the display apparatus 100 can be used in electronic devices, including but not limited to tablet computers, notebook computers, and desktop computers. According to implementations of the disclosure, the specific type of the display apparatus 100 is not particularly limited, and those skilled in the art can design correspondingly according to the specific usage requirements of the display apparatus 100, which will not be repeated herein.

In exemplary implementations, the display apparatus 100 may further include other necessary elements and components such as a drive board, a power board, a high voltage board, and a key control board, and those skilled in the art may supplement according to the specific type and the actual function of the display apparatus 100, which will not be repeated herein.

Figure 2:
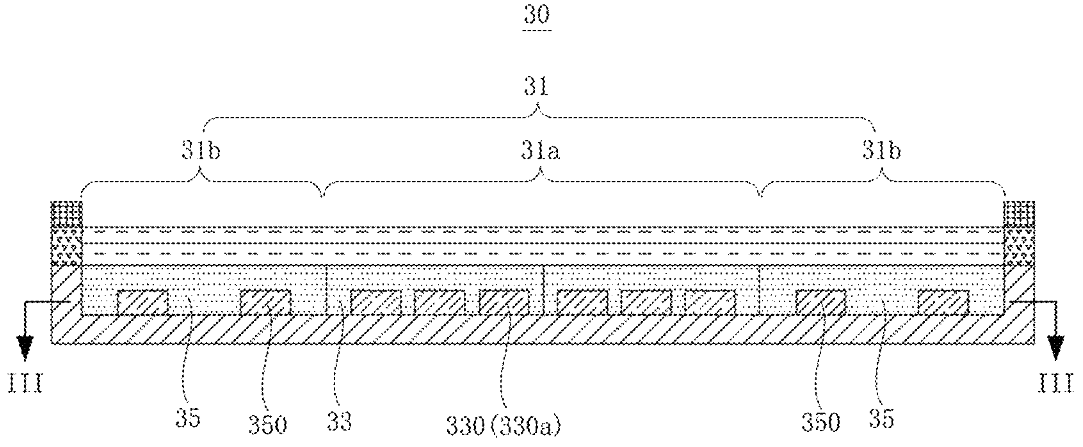
FIG. 2 is a schematic diagram of a layered structure of a backlight module disclosed in a second implementation of the disclosure.
Figure 3:
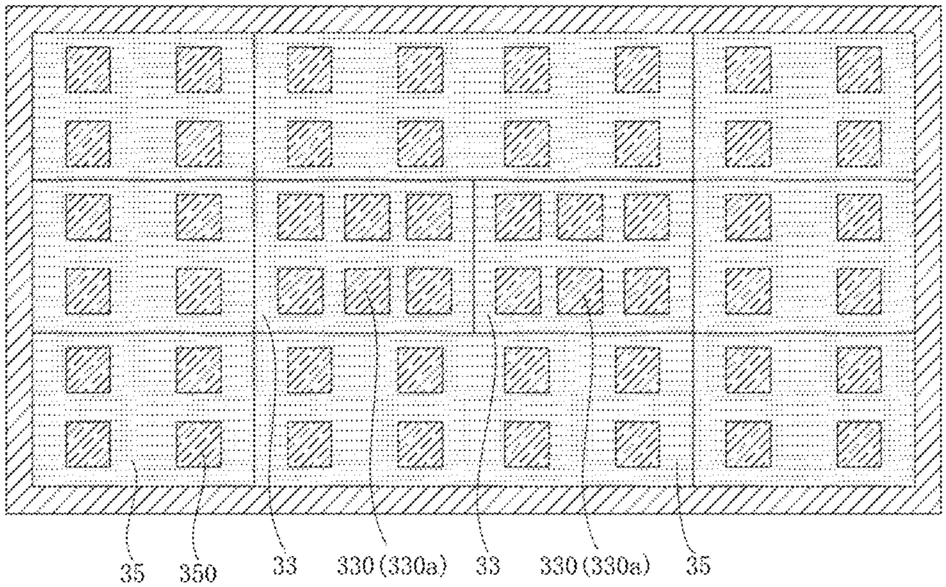
FIG. 3 is a schematic cross-sectional view of the backlight module illustrated in FIG. 2 along a direction III-III.

In implementations of the disclosure, referring to FIGS. 2 and 3, FIG. 2 is a schematic diagram of a layered structure of a backlight module disclosed in a second implementation of the disclosure. FIG. 3 is a schematic cross-sectional view of the backlight module illustrated in FIG. 2 along a direction III-III. The backlight module 30 has a light-emitting region 31. The light-emitting region 31 includes a first light-emitting region 31*a* and a second light-emitting region 31*b* encircling the first light-emitting region 31*a*. The backlight module 30 may at least include at least one first light-emitting module 33 and at least one second light-emitting module 35. The at least one second light-emitting module 35 is arranged on a peripheral side of the first light-emitting module 33. The first light-emitting module 33 is located in the first light-emitting region 31*a*. The second light-emitting module 35 is located in the second light-emitting region 31*b*. The first light-emitting module 33 includes multiple first light strings 330. The second light-emitting module 35 includes multiple second light strings 350. The multiple first light strings 330 has a layout density greater than the multiple second light strings 350. That is, a distance between any two adjacent first light strings 330 is smaller than a distance between any two adjacent second light strings 350.

It can be understood that each first light string 330 and each second light string 350 each correspond to a separate control channel. In this way, the brightness of each first light string 330 and each second light string 350 can be adjusted. The multiple first light strings 330 has a layout density greater than the multiple second light strings 350, so that the brightness adjustment of the first light-emitting module 33 can be finer. That is, the first light-emitting module 33 can achieve brightness adjustment in a smaller region, and the gradient of brightness adjustment can be smaller. In addition, the first light-emitting module 33 is located in the first light-emitting region 31*a*, and the second light-emitting module 35 is located in the second light-emitting region 31*b*. That is, the first light-emitting module 33 is located in a middle region of the light-emitting region 31 (that is, the first light-emitting module 33 is arranged at a position corresponding to the first light-emitting region 31*a*), and the second light-emitting module 35 is located at an edge area of the light-emitting region 31 (that is, the second light-emitting module 35 is arranged at a position corresponding to the second light-emitting region 31*b*). The middle region of the light-emitting region 31 is a most concentrated region of sight, and fine dimming can be achieved in this region, thereby improving the visual experience of the user. Moreover, since fine dimming of the light-emitting region 31 of the backlight module 30 is only performed in the middle region, only the first light-emitting module 33 has the increase in production process and production cost, which avoids excessive increase in production process and production cost.

It can be understood that the fine dimming refers to that the driver module can adjust the brightness of light strings in a smaller unit area and the gradient of brightness adjustment is smaller, or that the driver module can adjust the brightness of more light strings in a unit area and the gradient of brightness adjustment is smaller.

In implementations of the disclosure, referring to FIG. 1, the display apparatus 100 has a display region 101. The display region 101 includes a first display region 101*a* and a second display region 101*b* encircling the first display region 101*a*. The first light-emitting module 33 of the backlight module 30 is located in the first display region 101*a*, and the second light-emitting module of the backlight module 30 35 is located in the second display region 101*b*. The first display region 101*a* is a middle region of the display apparatus 100. The middle region is a most concentrated region of sight, and fine dimming can be achieved in this region, thereby improving the visual experience of the user and increasing the product competitiveness.

In conclusion, the backlight module 30 disclosed in implementations of the disclosure has a light-emitting region 31. The light-emitting region 31 includes a first light-emitting region 31*a* and a second light-emitting region 31*b* encircling the first light-emitting region 31*a*. The backlight module 30 may at least include at least one first light-emitting module 33 and at least one second light-emitting module 35. The at least one second light-emitting module 35 is arranged on a peripheral side of the first light-emitting module 33. The first light-emitting module 33 is located in the first light-emitting region 31*a*. The second light-emitting module 35 is located in the second light-emitting region 31*b*. The first light-emitting module 33 includes multiple first light strings 330. The second light-emitting module 35 includes multiple second light strings 350. The multiple first light strings 330 has a layout density greater than the multiple second light strings 350. Therefore, since the multiple first light strings 330 in the first light-emitting region 31*a* has a layout density greater than the multiple second light strings 350 in the second light-emitting region 31*b*, fine dimming can be achieved in the first light-emitting region 31*a*, thereby improving the visual experience of the user. Moreover, since the first light-emitting region 31*a* is in a middle region of the backlight module 30, only the first light-emitting module 33 has the increase in production process and production cost, which avoids excessive increase in production process and production cost.

Figure 4:
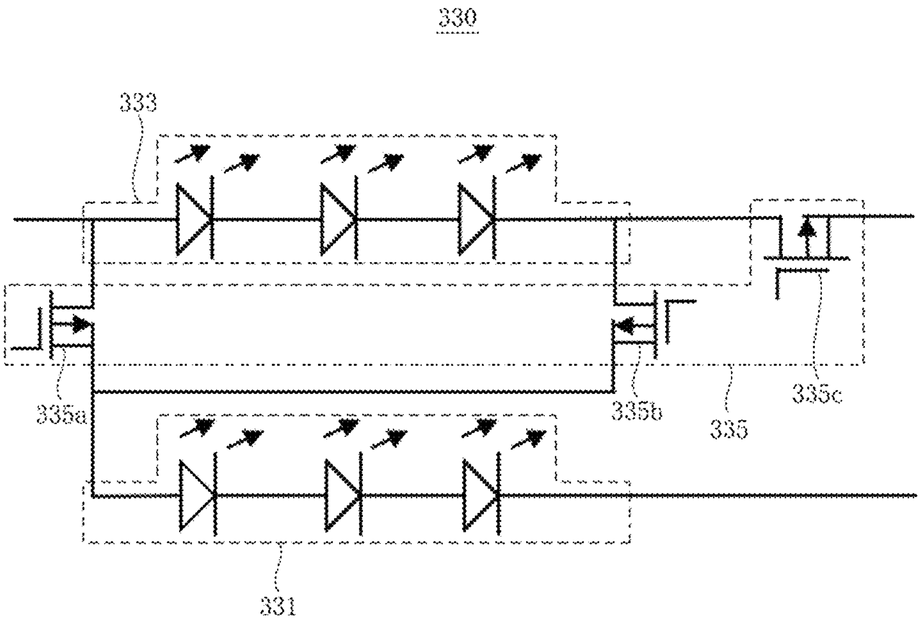
FIG. 4 is a schematic diagram of a first structure of a first light string of the backlight module illustrated in FIG. 2.

In implementations of the disclosure, referring to FIG. 4, FIG. 4 is a schematic diagram of a first structure of a first light string of the backlight module illustrated in FIG. 2. The first light string 330 includes a first light-emitting column 331, a second light-emitting column 333, and a first switch unit 335. The first switch unit 335 is electrically connected to a first terminal of the first light-emitting column 331, a first terminal of the second light-emitting column 333, and a second terminal of the second light-emitting column 333. The first switch unit 335 is configured to selectively connect the first light-emitting column 331 and the second light-emitting column 333 in series, or electrically connect the first terminal of the first light-emitting column 331 to the first terminal of the second light-emitting column 333.

In exemplary implementations, the first terminal of the first light-emitting column 331 may be an anode of the first light-emitting column 331, and the first terminal of the second light-emitting column 333 may be an anode of the second light-emitting column 333. The second terminal of the first light-emitting column 331 may be a cathode of the first light-emitting column 331, and the second terminal of the second light-emitting column 333 may be a cathode of the second light-emitting column 333.

In exemplary implementations, the first switch unit 335 includes a first drive transistor 335*a*, a second drive transistor 335*b*, and a third drive transistor 335*c*. A first terminal of the first drive transistor 335*a* is electrically connected to the first terminal of the first light-emitting column 331. A second terminal of the first drive transistor 335*a* is electrically connected to the first terminal of the second light-emitting column 331. A first terminal of the second drive transistor 335*b* is electrically connected to the first terminal of the first light-emitting column 331. A second terminal of the second drive transistor 335*b* is electrically connected to the second terminal of the second light-emitting column 333. A second terminal of the third drive transistor 335*c* is electrically connected to the second terminal of the second light-emitting column 333. A control terminal of the first drive transistor 335*a*, a control terminal of the second drive transistor 335*b*, and a control terminal of the third drive transistor 335*c* are each configured to receive a control signal.

In exemplary implementations, the first terminal of the drive transistor may be a source of the drive transistor, the second terminal of the drive transistor may be a drain of the drive transistor, and the control terminal of the drive transistor may be a gate of the drive transistor. Alternatively, the first terminal of the drive transistor may be the drain of the drive transistor, the second terminal of the drive transistor may be the source of the drive transistor, and the control terminal of the drive transistor may be the gate of the drive transistor. Specifically, when the first drive transistor 335*a* is turned off, the second drive transistor 335*b* is turned on, and the third drive transistor 335*c* is turned off, the first light-emitting column 331 and the second light-emitting column 333 are connected in series, that is, the second terminal of the second light-emitting column 333 can be electrically connected to the first terminal of the first light-emitting column 331. When the first drive transistor 335*a* is turned on, the second drive transistor 335*b* is turned off, and the third drive transistor 335*c* is turned on, the first terminal of the first light-emitting column 331 is electrically connected to the first terminal of the second light-emitting column 333.

It can be understood that, when the display apparatus 100 does not require fine display, the first light-emitting column 331 and the second light-emitting column 333 are connected in series, so that the first light-emitting column 331 and the second light-emitting column 333 can be simultaneously driven to emit lights, which is beneficial to control the light-emitting brightness of the first light-emitting column 331 and the light-emitting brightness of the second light-emitting column 333 to be consistent. When the display apparatus 100 requires fine display, the first terminal of the first light-emitting column 331 is electrically connected to the first terminal of the second light-emitting column 333, and the second terminal of the first light-emitting column 331 and the second terminal of the second light-emitting column 333 each correspond to a separate control channel, so that the light-emitting brightness of the first light-emitting column 331 and the light-emitting brightness of the second light-emitting column 333 can be adjusted independently, which make the display more delicate.

Figure 5:
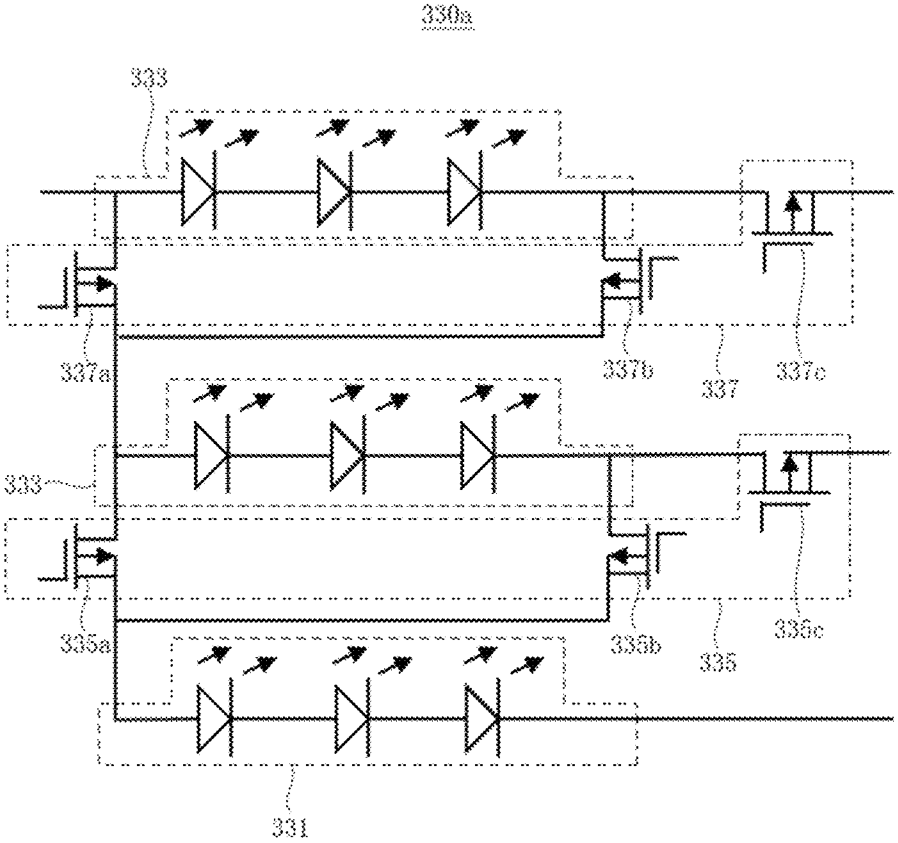
FIG. 5 is a schematic diagram of a second structure of a first light string of the backlight module illustrated in FIG. 2.

In implementations of the disclosure, referring to FIG. 5, FIG. 5 is a schematic diagram of a second structure of a first light string of the backlight module illustrated in FIG. 2. The first light string 330*a* of the second structure includes a first light-emitting column 331, multiple second light-emitting columns 333, a first switch unit 335, and at least one second switch unit 337. The first switch unit 335 is electrically connected to a first terminal of the first light-emitting column 331, a first terminal of the second light-emitting column 333, and a second terminal of the second light-emitting column 333. That is, the first terminal of the first light-emitting column 331 can be electrically connected to the first terminal and the second terminal of the second light-emitting column 333 through the first switch unit 335. The second switch unit 337 is electrically connected to a first terminal of one second light-emitting column 333 and a first terminal and a second terminal of another second light-emitting column 333. That is, any two second light-emitting columns 333 are electrically connected through the second switch unit 337, and a second terminal of one second light-emitting column 333 is electrically connected to one first switch unit 335 or one second switch unit 337. The first switch unit 335 and the second switch unit 337 are configured to selectively connect the first light-emitting column 331 and the multiple second light-emitting columns 333 in series, or electrically connect the first terminal of the first light-emitting column 331 to first terminals of the multiple second light-emitting columns 333. That is, the first terminals of the multiple second light-emitting columns 333 are electrically connected through the second switch unit 337, a first terminal of one second light-emitting column 333 is connected to a first terminal of another second light-emitting column 333 through the second switch unit 337, and a first terminal of any one of the multiple second light-emitting columns 333 is electrically connected to the first terminal of the first light-emitting column 331 through the first switch unit 335.

For ease of understanding, in the disclosure, for example, there is one first light-emitting column 331, three second light-emitting columns 333, and two second switch units 337, and the first light-emitting column 331 and the second light-emitting columns 333 are arranged adjacently in sequence for illustration. Specifically, one first switch unit 335 is electrically connected to a first terminal of one first light-emitting column 331 and a first terminal and a second terminal of one second light-emitting column 333. One second switch unit 337 is electrically connected to a first terminal of one second light-emitting column 333 and a first terminal and a second terminal of another second light-emitting column 333. A second terminal of one second light-emitting column 333 is electrically connected to one first switch unit 335 or one second switch unit 337. A first terminal of one of the three second light-emitting columns 333 is electrically connected to one first switch unit 335 and one second switch unit 337. A first terminal of one second light-emitting column 333 is electrically connected to the two second switch units 337. A first terminal of one second light-emitting column 333 is electrically connected to only one second switch unit 337.

In exemplary implementations, the first switch unit 335 includes a first drive transistor 335*a*, a second drive transistor 335*b*, and a third drive transistor 335*c*. A first terminal of the first drive transistor 335*a* and a first terminal of the second drive transistor 335*b* are electrically connected to the first terminal of the first light-emitting column 331. A second terminal of the first drive transistor 335*a* is electrically connected to the first terminal of the second light-emitting column 333. A second terminal of the second drive transistor 335*b* is electrically connected to the second terminal of the second light-emitting column 333. A second terminal of the third drive transistor 335*c* is electrically connected to the second terminal of the second light-emitting column 333. A control terminal of the first drive transistor 335*a*, a control terminal of the second drive transistor 335*b*, and a control terminal of the third drive transistor 335*c* are each configured to receive a control signal.

In exemplary implementations, the second switch unit 337 includes a fourth drive transistor 337*a*, a fifth drive transistor 337*b*, and a sixth drive transistor 337*c*. A first terminal of the fourth drive transistor 337*a* and a first terminal of the fifth drive transistor 337*b* are electrically connected to a first terminal of one second light-emitting column 333. A second terminal of the fourth drive transistor 337*a* is electrically connected to a first terminal of another second light-emitting column 333. A second terminal of the fifth drive transistor 337*b* is electrically connected to a second terminal of the another second light-emitting column 333. A second terminal of the sixth drive transistor 337*c* is electrically connected to the second terminal of another second light-emitting column 333. A control terminal of the fourth drive transistor 337*a*, a control terminal of the fifth drive transistor 337*b*, and a control terminal of the sixth drive transistor 337*c* are each configured to receive a control signal.

Specifically, when the first drive transistor 335*a* is turned off, the second drive transistor 335*b* is turned on, the third drive transistor 335*c* is turned off, the fourth drive transistor 337*a* is turned off, the fifth drive transistor 337*b* is turned on, and the sixth drive transistor 337*c* is turned off, one first light-emitting column 331 and the multiple second light-emitting columns 333 are connected in series, that is, the first terminal of the first light-emitting column 331 is electrically connected to a second terminal of one second light-emitting column 333, and a first terminal of the second light-emitting column 333 is electrically connected to a second terminal of another second light-emitting column 333. When the first drive transistor 335*a* is turned on, the second drive transistor 335*b* is turn off, the third drive transistor 335*c* is turned on, the fourth drive transistor 337*a* is turned on, the fifth drive transistor 337*b* is turned off, and the sixth drive transistor 337*c* is turned on, the first terminal of the first light-emitting column 331 is electrically connected to first terminals of the multiple second light-emitting columns 333.

It can be understood that, when the display apparatus 100 does not require fine display, the first light-emitting column 331 and the multiple second light-emitting columns 333 are connected in series, so that the first light-emitting column 331 and the multiple second light-emitting columns 333 can be simultaneously driven to emit lights, which is beneficial to control the light-emitting brightness of the first light-emitting column 331 and the light-emitting brightness of the second light-emitting columns 333 to be consistent. When the display apparatus 100 requires fine display, the first terminal of the first light-emitting column 331 is electrically connected to the first terminals of the multiple second light-emitting columns 333, and the second terminal of the first light-emitting column 331 and second terminals of the multiple second light-emitting columns 333 each correspond to a separate control channel, so that the light-emitting brightness of the first light-emitting column 331 and the light-emitting brightness of each of the second light-emitting columns 333 can be adjusted independently, which make the display more delicate.

In exemplary implementations, the number of the second light-emitting columns 333 may range from 1 to 10, for example, may be 1, 3, 5, 7, 10, or another number, which is not limited herein.

In exemplary implementations, the first drive transistor 335*a*, the second drive transistor 335*b*, the third drive transistor 335*c*, the fourth drive transistor 337*a*, the fifth drive transistor 337*b*, and the sixth drive transistor 337*c* may be N-type MOS transistors or P-type MOS transistors, which is not limited herein. In implementations of the disclosure, for example, the first drive transistor 335*a*, the second drive transistor 335*b*, the third drive transistor 335*c*, the fourth drive transistor 337*a*, the fifth drive transistor 337*b*, and the sixth drive transistor 337*c* each are P-type MOS transistors for illustration.

Figure 6:
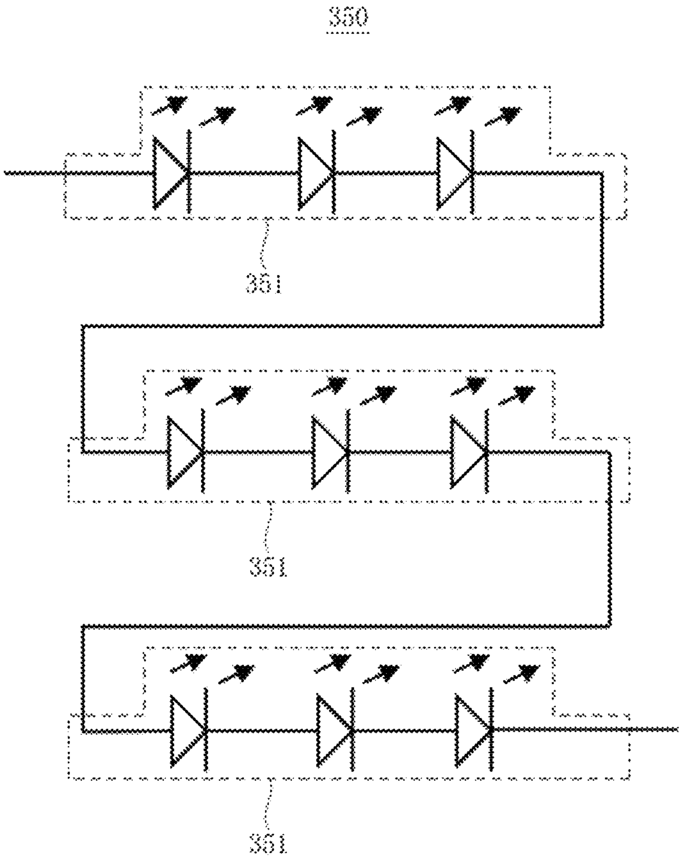
FIG. 6 is a schematic structural diagram of a second light string of the backlight module illustrated in FIG. 2.

In implementations of the disclosure, referring to FIG. 6, FIG. 6 is a schematic structural diagram of a second light string of the backlight module illustrated in FIG. 2. The second light string 350 includes multiple third light-emitting columns 351. The multiple third light-emitting columns 351 are sequentially connected in series, that is, a second terminal of a third light-emitting column 351 is electrically connected to a first terminal of an adjacent third light-emitting column 351.

In exemplary implementations, the first terminal of the third light-emitting column 351 may be an anode of the third light-emitting column 351, and the second terminal of the third light-emitting column 351 may be a cathode of the third light-emitting column 351.

In exemplary implementations, the number of the third light-emitting columns 351 may range from 2 to 10, for example, may be 2, 3, 4, 7, 9, 10, or another number, which is not limited herein.

In implementations of the disclosure, the first light-emitting column 331, the second light-emitting column 333, and the third light-emitting column 351 each include multiple light-emitting elements connected in series. The number of light-emitting elements in the first light-emitting column 331, the number of light-emitting elements in the second light-emitting column 333, and the number of light-emitting elements in the third light-emitting column 351 each may range from 2 to 20, for example, may be 2, 3, 5, 10, 14, 20, or another number, which is not limited herein.

In exemplary implementations, the light-emitting element may be a Mini Light-Emitting Diode (Mini LED) or a Micro Light-Emitting Diode (Micro LED), which is not limited herein.

Figure 7:
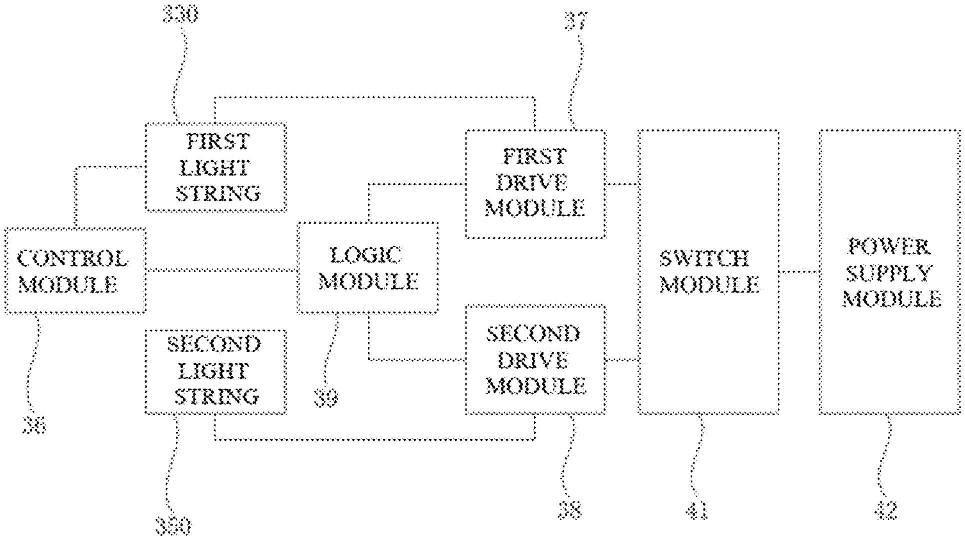
FIG. 7 is a schematic diagram illustrating a circuit connection of the backlight module disclosed in the second implementation of the disclosure.

In other implementations of the disclosure, referring to FIGS. 4 and 7 together, FIG. 7 is a schematic diagram illustrating a circuit connection of the backlight module disclosed in the second implementation of the disclosure. The backlight module 30 further includes a control module 36. The control module 36 is electrically connected to control terminals of multiple first drive transistors 335*a*, control terminals of multiple second drive transistors 335*b*, and control terminals of multiple third drive transistors 335*c*. The control module 36 is configured to generate a first control signal for controlling the first drive transistor 335*a* to be turned off and the third drive transistor 335*c* to be turned off and a second control signal for controlling the second drive transistor 335*b* to be turned on, or the control module 36 is configured to generate a third control signal for controlling the first drive transistor 335*a* to be turned on and the third drive transistor 335*c* to be turned on and a fourth control signal for controlling the second drive transistor 335*b* to be turned off.

In other implementations of the disclosure, referring to FIGS. 5 and 7 together, the backlight module 30 further includes a control module 36. The control module 36 is electrically connected to control terminals of multiple first drive transistors 335*a*, control terminals of multiple second drive transistors 335*b*, control terminals of multiple third drive transistors 335*c*, control terminals of multiple fourth drive transistors 337*a*, control terminals of multiple fifth drive transistors 337*b*, and control terminals of multiple sixth drive transistors 337*c*. The control module 36 is configured to generate a first control signal for controlling the first drive transistor 335*a* to be turned off, the third drive transistor 335*c* to be turned off, the fourth drive transistor 337*a* to be turned off, and the sixth drive transistor 337*c* to be turned off, and a second control signal for controlling the second drive transistor 335*b* to be turned on and the fifth drive transistor 337*b* to be turned on, or the control module 36 is configured to generate a third control signal for controlling the first drive transistor 335*a* to be turned on, the third drive transistor 335*c* to be turned on, the fourth drive transistor 337*a* to be turned on, and the sixth drive transistor 337*c* to be turned on, and a fourth control signal for controlling the second drive transistor 335*b* to be turned off and the fifth drive transistor 337*b* to be turned off.

In exemplary implementations, the first control signal may be a low-level signal, the second control signal may be a high-level signal, the third control signal may be a high-level signal, and the fourth control signal may be a low-level signal.

Figure 8:
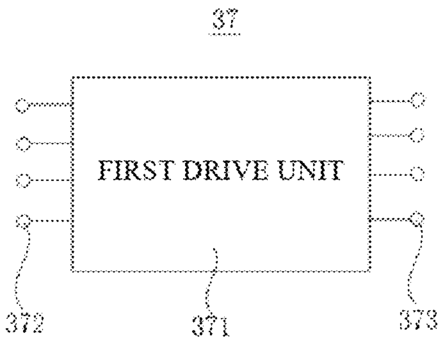
FIG. 8 is a schematic structural diagram of a first drive module of the backlight module illustrated in FIG. 7.

In implementations of the disclosure, referring to FIGS. 4, 7, and 8 together, FIG. 8 is a schematic structural diagram of a first drive module of the backlight module illustrated in FIG. 7. When there is one first light-emitting column 331 and one second light-emitting column 333, the backlight module 30 further includes multiple first drive modules 37. The first drive module 37 includes a first drive unit 371, multiple first connection terminals 372, and multiple second connection terminals 373. The first connection terminal 372 is electrically connected to the first terminal of the second light-emitting column 333. The multiple second connection terminals 373 are electrically connected to a first terminal of the third drive transistor 335*c* and a second terminal of the first light-emitting column 331 respectively. The first drive unit 371 is configured to control a potential of the second connection terminal 373 to adjust a light-emitting brightness of the first light-emitting column 331 and a light-emitting brightness of the second light-emitting column 333.

For better description of the disclosure and illustration of the drawings, only one first drive module 37 and one first light string 330 are illustrated in FIG. 7. In fact, there are multiple first drive modules 37 and multiple first light strings 330.

Specifically, when the first light-emitting column 331 and the second light-emitting column 333 are connected in series, the first drive unit 371 is configured to control the potential of the second connection terminal 373 electrically connected to the second terminal of the first light-emitting column 331 to adjust the light-emitting brightness of the first light-emitting column 331 and the light-emitting brightness of the second light-emitting column 333. When the first terminal of the first light-emitting column 331 is electrically connected to the first terminal of the second light-emitting column 333, the first drive unit 371 is configured to control the potential of the second connection terminal 373 electrically connected to the first terminal of the third drive transistor 335*c* and the second terminal of the first light-emitting column 331, to adjust the light-emitting brightness of the first light-emitting column 331 and the light-emitting brightness of the second light-emitting column 333.

In other implementations of the disclosure, referring to FIGS. 5, 7, and 8, when there is one first light-emitting column 331 and multiple second light-emitting columns 333, the backlight module 30 further includes multiple first drive modules 37. Each of the first drive modules includes a first drive unit 371, multiple first connection terminals 372, and multiple second connection terminals 373. The first connection terminal 372 is electrically connected to a first terminal of one of the multiple second light-emitting columns 333, and the first terminal of the second light-emitting column 333 is only electrically connected to one switch unit (the first switch unit 335 or the second switch unit 337). The multiple second connection terminals 373 are electrically connected to the first terminal of the third drive transistor 335*c*, the first terminal of the sixth drive transistor 337*c*, and the second terminal of the first light-emitting column 331 respectively. The first drive unit 371 is configured to control the potential of the second connection terminal 373 to adjust the light-emitting brightness of the first light-emitting column 331 and the light-emitting brightness of the second light-emitting column 333.

For better description of the disclosure and illustration of the drawings, only one second drive module 38 and one second light string 350 are illustrated in FIG. 7. In fact, there are multiple second drive modules 38 and multiple second light strings 350.

Specifically, when the first light-emitting column 331 and the multiple second light-emitting columns 333 are connected in series, the first drive unit 371 is configured to control the potential of the second connection terminal 373 electrically connected to the second terminal of the first light-emitting column 331, to adjust the light-emitting brightness of the first light-emitting column 331 and the light-emitting brightness of the multiple second light-emitting columns 333. When the first terminal of the first light-emitting column 331 is electrically connected to first terminals of the multiple second light-emitting columns 333 at the same time, the first drive unit 371 is configured to control the potential of the second connection terminal 373 electrically connected to the first terminal of the third drive transistor 335*c*, the first terminal of the sixth drive transistor 337*c*, and the second terminal of the first light-emitting column 331, to adjust the light-emitting brightness of the first light-emitting column 331 and the light-emitting brightness of the multiple second light-emitting columns 333.

In exemplary implementations, one first drive module 37 corresponds to one first light-emitting module 33. That is, one first drive module 37 is electrically connected to multiple first light strings 330 of one first light-emitting module 33. The first drive unit 371 may be a driving integrated chip.

In exemplary implementations, the number of the first connection terminals 372 and the number of the second connection terminals 373 are determined according to the number of the first light strings 330 (330*a*) of the first light-emitting module 33 and the number of the first light-emitting columns 331 and the second light-emitting columns 333 in the first light string 330 (330*a*), which is not limited herein.

Figure 9:
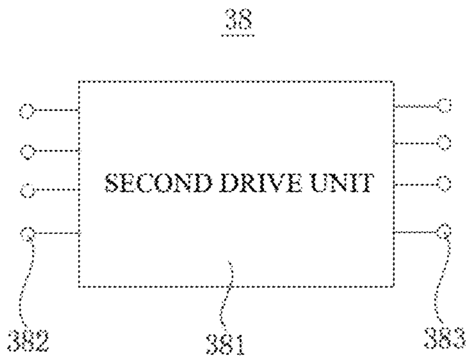
FIG. 9 is a schematic structural diagram of a second drive module of the backlight module illustrated in FIG. 7.

In implementations of the disclosure, referring to FIGS. 6 and 9 together. FIG. 9 is a schematic structural diagram of a second drive module of the backlight module illustrated in FIG. 7. The backlight module 30 further includes multiple second drive modules 38. The second drive module 38 includes a second drive unit 381, multiple third connection terminals 382, and multiple fourth connection terminals 383. The third connection terminals 382, the multiple third light-emitting columns 351, and the fourth connection terminal 383 are connected in series. That is, the multiple third light-emitting columns 351 are connected in series between the third connection terminal 382 and the fourth connection terminal 383. The second drive unit 381 is configured to control the light-emitting brightness of the multiple third light-emitting columns 351.

It can be understood that, the second drive unit 381 is configured to control a potential of the third connection terminal 382 and/or the fourth connection terminal 383 to adjust the light-emitting brightness of the third light-emitting column 351, which is not limited herein.

In exemplary implementations, one second drive module 38 corresponds to one second light-emitting module 35. That is, one second drive module 38 is electrically connected to multiple second light strings 350 of one second light-emitting module 35. The second drive unit 381 may be a driving integrated chip.

In exemplary implementations, the number of the third connection terminals 382 and the number of the fourth connection terminals 383 are determined according to the number of the second light strings 350 of the second light-emitting module 35, which is not limited herein.

It can be understood that the light-emitting brightness of the first light string 330 of each first light-emitting module 33 is individually controlled through multiple first drive modules 37, and the brightness of the second light string 350 of each second light-emitting module 35 is individually controlled through multiple second drive modules 38. In this way, the first light string 330 and the second light string 350 in a certain region can be turned off according to display requirements to achieve complete black, so as to achieve ultra-high contrast, and make a bright field brighter and a dark field darker, thereby achieving a better and more detailed display effect.

Figure 10:
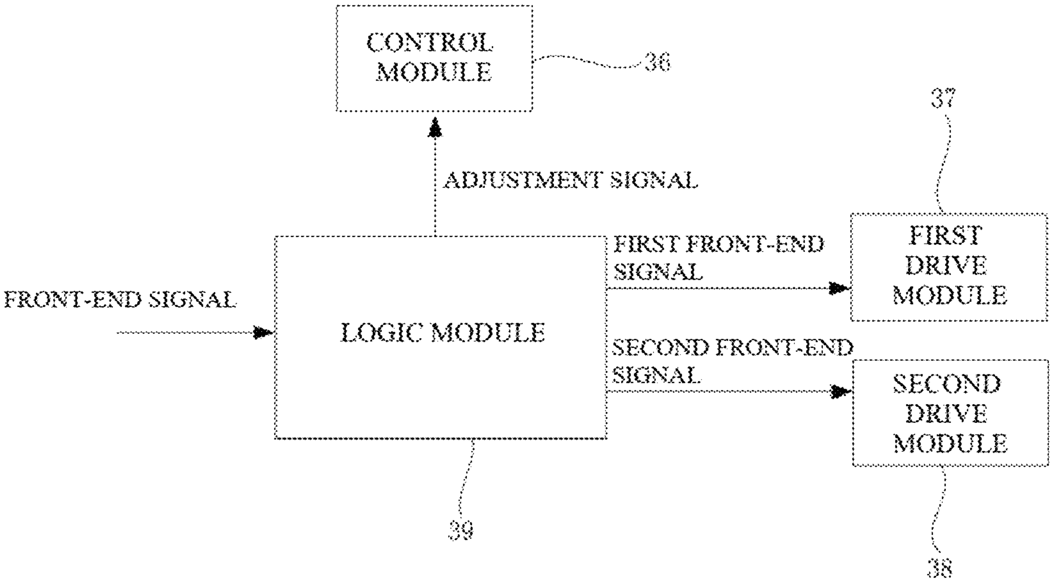
FIG. 10 is a schematic diagram illustrating a working principle of a logic module of the backlight module illustrated in FIG. 7.

In implementations of the disclosure, referring to FIGS. 7 and 10 together, FIG. 10 is a schematic diagram illustrating a working principle of a logic module of the backlight module illustrated in FIG. 7. The backlight module 30 further includes a logic module 39. The logic module 39 is configured to receive a front-end signal and classify the front-end signal as a first front-end signal or a second front-end signal according to the light-emitting region corresponding to the front-end signal. The first front-end signal corresponds to the first light-emitting region 31*a*, and the second front-end signal corresponds to the second light-emitting region 31*b*. The logic module 39 is configured to analyze the first front-end signal into an adjustment signal and a first potential signal and analyze the second front-end signal into a second potential signal, transmit the adjustment signal to the control module 36, transmit the first potential signal to the first drive module 37, and transmit the second potential signal to the second drive module 38.

In exemplary implementations, the front-end signal may be transmitted from a System on Chip (SOC).

In exemplary implementations, the control module 36 is configured to output the first control signal and the second control signal or output the third control signal and the fourth control signal according to the adjustment signal. The first drive unit 371 is configured to adjust the potential of the second connection terminal 373 according to the first potential signal. The second drive unit 381 is configured to adjust the potential of the third connection terminal 382 and/or the fourth connection terminal 383 according to the second potential signal.

It can be understood that when the first front-end signal corresponds to a low source resolution or a rough display quality, the control module 36 is configured to output the first control signal and the second control signal, that is, the first light-emitting column 331 and the second light-emitting column 333 are connected in series. When the first front-end signal corresponds to a high source resolution or a fine display quality, the control module 36 is configured to output the third control signal and the fourth control signal, that is, the first terminal of the first light-emitting column 331 is electrically connected to the first terminal of the second light-emitting column 333. The brightness of the first light-emitting column 331 and the brightness of the second light-emitting column 333 can be adjusted independently to make the display more delicate.

In exemplary implementations, the source resolution refers to a resolution corresponding to a signal transmitted from a signal source.

In exemplary implementations, the backlight module 30 further includes a switch module 41 and a power supply module 42. The switch module 41 is electrically connected to the first drive module 37, the second drive module 38, and the power supply module 42. The switch module 41 is configured to electrically connect the power supply module 42 to the first drive module 37 and to electrically connect the power supply module 42 to the second drive module 38. The power supply module 42 is configured to supply power to the first drive module 37 and the second drive module 38.

In exemplary implementations, referring to FIG. 1, the backlight module 30 further includes a backplane 45, a plastic frame 46, a buffer pad 47, and an optical film assembly 48. The first light-emitting module 33 and the second light-emitting module 35 are arranged in the backplane 45. The control module 36, the first drive module 37, the second drive module 38, the switch module 41, and the power supply module 42 can be arranged on one side of the backplane 45. The backplane 45 is stacked with the display panel 10. The plastic frame 46 is arranged on one side of the backplane 45 facing the display panel 10. The buffer pad 47 is arranged on one side of the plastic frame 46 facing the display panel 10. That is, the buffer pad 47 is sandwiched between the plastic frame 46 and the display panel 10. The optical film assembly 48 is arranged on a light-emitting side of the first light-emitting module 33 and the second light-emitting module 35 and is located on an inside of the plastic frame 46.

It can be understood that the optical film assembly 48 may at least include at least one prism sheet and at least one diffusion sheet, where the prism sheet and the diffusion sheet are stacked. The prism sheet is used to increase the brightness of lights emitted by the first light-emitting module 33 and the second light-emitting module 35. The diffusion sheet is used to make lights emitted by the first light-emitting module 33 and the second light-emitting module 35 more uniform, and avoid that the brightness of the first light-emitting region 31*a* is inconsistent with the brightness of the second light-emitting region 31*b*.

In exemplary implementations, the display apparatus 100 further includes a mainboard. The mainboard is electrically connected to the logic module 39 and the power supply module 42. The mainboard is configured to provide the front-end signal to the logic module and supply power to the power supply module 42.

In conclusion, the backlight module 30 disclosed in implementations of the disclosure has a light-emitting region 31. The light-emitting region 31 includes a first light-emitting region 31*a* and a second light-emitting region 31*b* encircling the first light-emitting region 31*a*. The backlight module 30 may at least include at least one first light-emitting module 33 and at least one second light-emitting module 35. The at least one second light-emitting module 35 is arranged on a peripheral side of the first light-emitting module 33. The first light-emitting module 33 is located in the first light-emitting region 31*a*. The second light-emitting module 35 is located in the second light-emitting region 31*b*. The first light-emitting module 33 includes multiple first light strings 330. The second light-emitting module 35 includes multiple second light strings 350. The multiple first light strings 330 has a layout density greater than the multiple second light strings 350. Therefore, since the multiple first light strings 330 in the first light-emitting region 31*a* has a layout density greater than the multiple second light strings 350 in the second light-emitting region 31*b*, fine dimming can be achieved in the first light-emitting region 31*a*, thereby improving the visual experience of the user. Moreover, since the first light-emitting region 31*a* is in a middle region of the backlight module 30, only the first light-emitting module 33 has the increase in production process and production cost, which avoids excessive increase in production process and production cost.

In the description of the specification, the description of the reference terms "an implementation", "some implementations", "exemplary implementations", "examples", "specific examples" or "some examples", etc. mean that a particular feature, structure, material, or characteristic described in combination with the implementation or example is included in at least one implementation or example of the disclosure. In the specification, schematic representations of the above terms do not necessarily refer to the same implementation or example. Furthermore, the particular features, structures, materials, or characteristics described may be combined in a suitable manner in any one or more implementations or examples.

It should be understood that the application of the disclosure is not limited to the above examples, those skilled in the art can make improvements or changes based on the above descriptions, and all these improvements and changes should fall within the scope of the appended claims of the disclosure. Those skilled in the art can understand that implementing all or part of the technical solutions of the above implementations and making equivalent changes according to the claims of the disclosure still fall within the scope covered by the disclosure.

What is claimed is:

1. A backlight module, comprising: a first light-emitting region and a second light-emitting region encircling the first light-emitting region, wherein the backlight module comprises at least one first light-emitting module and at least one second light-emitting module, the at least one second light-emitting module is arranged on a peripheral side of the first light-emitting module, the at least one first light-emitting module is located in the first light-emitting region, and the at least one second light-emitting module is located in the second light-emitting region;

the first light-emitting module comprises a plurality of first light strings, the second light-emitting module comprises a plurality of second light strings, and the plurality of first light strings has a layout density greater than the plurality of second light strings; and the first light string comprises a first light-emitting column, a second light-emitting column, and a first switch unit, the first switch unit is electrically connected to a first terminal of the first light-emitting column, a first terminal of the second light-emitting column, and a second terminal of the second light-emitting column, and the first switch unit is configured to selectively connect the first light-emitting column and the second light-emitting column in series, or electrically connect the first terminal of the first light-emitting column to the first terminal of the second light-emitting column; wherein the first switch unit comprises a first drive transistor, a second drive transistor, and a third drive transistor, a first terminal of the first drive transistor and a first terminal of the second drive transistor are electrically connected to the first terminal of the first light-emitting column, a second terminal of the first drive transistor is electrically connected to the first terminal of the second light-emitting column, a second terminal of the second drive transistor and a second terminal of the third drive transistor are electrically connected to the second terminal of the second light-emitting column, a control terminal of the first drive transistor, a control terminal of the second drive transistor, and a control terminal of the third drive transistor are each configured to receive a control signal; and wherein the first light-emitting column and the second light-emitting column are connected in series, when the first drive transistor is turned off, the second drive transistor is turned on, and the third drive transistor is turned off; or the first terminal of the first light-emitting column is electrically connected to the first terminal of the second light-emitting column, when the first drive transistor is turned on, the second drive transistor is turned off, and the third drive transistor is turned on.

2. The backlight module of claim 1, wherein the backlight module further comprises a control module, and the control module is electrically connected to the control terminal of the first drive transistor, the control terminal of the second drive transistor, and the control terminal of the third drive transistor; and the control module is configured to generate a first control signal for controlling the first drive transistor to be turned off and the third drive transistor to be turned off and a second control signal for controlling the second drive transistor to be turned on; or the control module is configured to generate a third control signal for controlling the first drive transistor to be turned on and the third drive transistor to be turned on and a fourth control signal for controlling the second drive transistor to be turned off.

3. The backlight module of claim 1, wherein the backlight module further comprises a plurality of first drive modules, each of the first drive modules comprises a first drive unit, a plurality of first connection terminals, and a plurality of second connection terminals, the plurality of first connection terminals are electrically connected to the first terminal of the second light-emitting column, the plurality of second connection terminals are electrically connected to a first terminal of the third drive transistor and a second terminal of the first light-emitting column, and the first drive unit is configured to control a potential of the second connection terminal to adjust a light-emitting brightness of the first light-emitting column and a light-emitting brightness of the second light-emitting column.

4. The backlight module of claim 2, wherein the backlight module further comprises a plurality of first drive modules, each of the first drive modules comprises a first drive unit, a plurality of first connection terminals, and a plurality of second connection terminals, the plurality of first connection terminals are electrically connected to the first terminal of the second light-emitting column, the plurality of second connection terminals are electrically connected to a first terminal of the third drive transistor and a second terminal of the first light-emitting column, and the first drive unit is configured to control a potential of the second connection terminal to adjust a light-emitting brightness of the first light-emitting column and a light-emitting brightness of the second light-emitting column.

5. A display apparatus, comprising: a first display region and a second display region encircling the first display region, wherein the display apparatus comprises a backlight module having a first light-emitting region and a second light-emitting region encircling the first light-emitting region, wherein the backlight module comprises at least one first light-emitting module and at least one second light-emitting module, the at least one second light-emitting module is arranged on a peripheral side of the first light-emitting module, the at least one first light-emitting module is located in the first light-emitting region, and the at least one second light-emitting module is located in the second light-emitting region;

the first light-emitting module comprises a plurality of first light strings, the second light-emitting module comprises a plurality of second light strings, and the plurality of first light strings has a layout density greater than the plurality of second light strings; and the first light string comprises a first light-emitting column, a second light-emitting column, and a first switch unit, the first switch unit is electrically connected to a first terminal of the first light-emitting column, a first terminal of the second light-emitting column, and a second terminal of the second light-emitting column, and the first switch unit is configured to selectively connect the first light-emitting column and the second light-emitting column in series, or electrically connect the first terminal of the first light-emitting column to the first terminal of the second light-emitting column; and the first light-emitting module of the backlight module is located in the first display region, and the second light-emitting module of the backlight module is located in the second display region, wherein the first switch unit comprises a first drive transistor, a second drive transistor, and a third drive transistor, a first terminal of the first drive transistor and a first terminal of the second drive transistor are electrically connected to the first terminal of the first light-emitting column, a second terminal of the first drive transistor is electrically connected to the first terminal of the second light-emitting column, a second terminal of the second drive transistor and a second terminal of the third drive transistor are electrically connected to the second terminal of the second light-emitting column, a control terminal of the first drive transistor, a control terminal of the second drive transistor, and a control terminal of the third drive transistor are each configured to receive a control signal; and wherein the first light-emitting column and the second light-emitting column are connected in series, when the first drive transistor is turned off, the second drive transistor is turned on, and the third drive transistor is turned off; or the first terminal of the first light-emitting column is electrically connected to the first terminal of the second light-emitting column, when the first drive transistor is turned on, the second drive transistor is turned off, and the third drive transistor is turned on.

6. The display apparatus of claim 5, wherein the backlight module further comprises a control module, and the control module is electrically connected to the control terminal of the first drive transistor, the control terminal of the second drive transistor, and the control terminal of the third drive transistor; and the control module is configured to generate a first control signal for controlling the first drive transistor to be turned off and the third drive transistor to be turned off and a second control signal for controlling the second drive transistor to be turned on; or the control module is configured to generate a third control signal for controlling the first drive transistor to be turned on and the third drive transistor to be turned on and a fourth control signal for controlling the second drive transistor to be turned off.

7. The display apparatus of claim 5, wherein the backlight module further comprises a plurality of first drive modules, each of the first drive modules comprises a first drive unit, a plurality of first connection terminals, and a plurality of second connection terminals, the plurality of first connection terminals are electrically connected to the first terminal of the second light-emitting column, the plurality of second connection terminals are electrically connected to a first terminal of the third drive transistor and a second terminal of the first light-emitting column, and the first drive unit is configured to control a potential of the second connection terminal to adjust a light-emitting brightness of the first light-emitting column and a light-emitting brightness of the second light-emitting column.

8. The display apparatus of claim 6, wherein the backlight module further comprises a plurality of first drive modules, each of the first drive modules comprises a first drive unit, a plurality of first connection terminals, and a plurality of second connection terminals, the plurality of first connection terminals are electrically connected to the first terminal of the second light-emitting column, the plurality of second connection terminals are electrically connected to a first terminal of the third drive transistor and a second terminal of the first light-emitting column, and the first drive unit is configured to control a potential of the second connection terminal to adjust a light-emitting brightness of the first light-emitting column and a light-emitting brightness of the second light-emitting column.

* * * * *